(12) United States Patent
Bhandary

(10) Patent No.: US 11,494,654 B2
(45) Date of Patent: Nov. 8, 2022

(54) METHOD FOR MACHINE FAILURE PREDICTION USING MEMORY DEPTH VALUES

(71) Applicant: AVANSEUS HOLDINGS PTE. LTD., Bugis Junction (SG)

(72) Inventor: Chiranjib Bhandary, Bangalore (IN)

(73) Assignee: Avanseus Holdings Pte. Ltd., Bugis Junction (SG)

( * ) Notice: Subject to any disclaimer, the term of this patent is extended or adjusted under 35 U.S.C. 154(b) by 1495 days.

(21) Appl. No.: 15/643,743

(22) Filed: Jul. 7, 2017

(65) Prior Publication Data

US 2018/0121794 A1    May 3, 2018

(30) Foreign Application Priority Data

Nov. 3, 2016   (IN) .............................. 201611037626
May 18, 2017   (IN) .............................. 201714017446

(51) Int. Cl.
  *G06N 3/08*    (2006.01)
  *G06N 3/04*    (2006.01)
  *G05B 23/02*   (2006.01)

(52) U.S. Cl.
  CPC ........... *G06N 3/084* (2013.01); *G06N 3/0445* (2013.01); *G05B 23/0254* (2013.01); *G05B 23/0283* (2013.01)

(58) Field of Classification Search
  None
  See application file for complete search history.

(56) References Cited

U.S. PATENT DOCUMENTS

| 5,448,681 A * | 9/1995 | Khan .................... G05B 13/027 706/23 |
| 5,649,065 A * | 7/1997 | Lo ......................... G06N 3/0445 706/41 |
| 6,708,160 B1 * | 3/2004 | Werbos .................... G06N 3/02 706/30 |

(Continued)

OTHER PUBLICATIONS

Werbos, P.J. (1990). "Backpropagation through time: What it does and how to do it". Proceedings of teh IEEE, vol. 78, No. 10, Oct. 1990, pp. 1550-1560. (Year: 1990).*

(Continued)

*Primary Examiner* — Paulinho E Smith
(74) *Attorney, Agent, or Firm* — Renner, Otto, Boisselle & Sklar, LLP

(57) ABSTRACT

Embodiments of the invention provide a method and system for machine failure prediction. The method comprises: identifying a plurality of basic memory depth values based on a composite sequence of machine failure history; ascertaining weight values for at least one of the identified basic memory depth values according to a pre-stored table which includes a plurality of mappings wherein each mapping relates a basic memory depth value to one set of weight values; and predicting a future failure using a Back Propagation Through Time (BPTT) trained Recurrent Neural Network (RNN) based on the ascertained weight values, wherein weight values related to a first basic memory depth value in the pre-stored table is ascertained based on a second set of weight values related to a second basic memory depth value which is less than the first basic memory depth value by a predetermined value.

11 Claims, 16 Drawing Sheets

(56) References Cited

U.S. PATENT DOCUMENTS

| | | | | |
|---|---|---|---|---|
| 8,756,183 | B1* | 6/2014 | Daily | G06N 3/049 706/20 |
| 9,336,482 | B1* | 5/2016 | Corrado | G06N 3/0445 |
| 2002/0116347 | A1* | 8/2002 | Snelgrove | G06Q 10/04 705/400 |
| 2003/0065525 | A1* | 4/2003 | Giacchetti | A61B 5/0059 705/1.1 |
| 2011/0320774 | A1* | 12/2011 | Jacobi | G06F 9/3857 712/205 |
| 2015/0162881 | A1* | 6/2015 | Hammi | H03F 3/189 330/291 |
| 2016/0282229 | A1* | 9/2016 | Qin | G06N 3/006 |
| 2016/0284347 | A1* | 9/2016 | Sainath | G06N 3/0454 |
| 2018/0046149 | A1* | 2/2018 | Ahmed | G05B 23/0229 |
| 2018/0046902 | A1* | 2/2018 | Liao | G06N 3/0454 |
| 2018/0121793 | A1* | 5/2018 | Bhandary | G06N 3/0445 |

OTHER PUBLICATIONS

Wang, S-C. (2003). "Artificial neural network." Chapter 5 of Interdisciplinary computing in java programming. Springer, Boston, MA, 2003. 81-100. (Year: 2003).*

Prokhorov, D.V. (2004). "Backpropagation through time and derivative adaptive critics: A common framework for comparison." Handbook of learning and approximate dynamic programming 2 (2004). 24 pages. (Year: 2004).*

Salfner, F. et al. (2010). A survey of online failure prediction methods. ACM Computing Surveys (CSUR), 42(3), 1-42. (Year: 2010).*

Malhi, A. et al. (2011). "Prognosis of defect propagation based on recurrent neural networks". IEEE Transactions on Instrumentation and Measurement, 60(3), 703-711. (Year: 2011).*

Chigurupati, A. et al. (2016, January). Predicting hardware failure using machine learning. In 2016 Annual Reliability and Maintainability Symposium (RAMS) (pp. 1-6). IEEE. (Year: 2016).*

Obst, O. et al. (Nov. 2010). "Improving recurrent neural network performance using transfer entropy". In International conference on neural information processing (pp. 193-200). LNCS, vol. 6444. Springer, Berlin, Heidelberg. (Year: 2010).*

Xu, C. et al. (Pub. Mar. 3, 2016). "Health status assessment and failure prediction for hard drives with recurrent neural networks". IEEE Transactions on Computers, 65(11), 3502-3508. (Year: 2016).*

* cited by examiner 1 0 0 0 0 0 1 0 0 0 0 0 1 0 0 0 0 0 1 0 0 0 0 0 1

| Basic Memory depth value | Number of iterations | Time gap to failure | Error limit | Memory depth | Number of iterations | Time gap to failure | Error limit |
|---|---|---|---|---|---|---|---|
| 10 | 91 | | 0.02000 | 15 | 1834 | | 0.02000 |
| 20 | 1800 | | 0.01000 | 25 | 454 | | 0.02000 |
| 30 | 510 | | 0.02000 | 35 | 373 | | 0.02000 |
| 40 | 652 | | 0.02000 | 50 | 1464 | | 0.01500 |
| 55 | 10627 | | 0.00800 | 60 | 6688 | | 0.00800 |
| 65 | 3559 | | 0.00800 | 70 | 8867 | | 0.00800 |
| 75 | 6265 | | 0.00800 | 80 | 4218 | | 0.00800 |
| 85 | 742 | | 0.00800 | 90 | 994 | | 0.00800 |
| 95 | 10136 | 92 | 0.00800 | 100 | 18100 | | 0.00800 |
| 105 | 8666 | | 0.00800 | 110 | 357 | | 0.00800 |
| 115 | 2934 | | 0.00800 | 120 | 9927 | 121 | 0.00800 |
| 125 | 2337 | 124 | 0.00800 | 130 | 7980 | 134 | 0.00800 |
| 135 | 1939 | | 0.00800 | 140 | 8105 | | 0.00700 |
| 145 | 16282 | | 0.00680 | 150 | 4439 | | 0.00680 |
| 155 | 3423 | | 0.00680 | 160 | 5817 | | 0.00650 |
| 165 | 6946 | | 0.00620 | 166 | 3911 | 165 | 0.00600 |
| 167 | 3906 | | 0.00600 | 168 | 1943 | | 0.00600 |
| 169 | 231 | | 0.00600 | 170 | 980 | | 0.00600 |
| 171 | 2651 | | 0.00600 | 172 | 9611 | 171 | 0.00600 |
| 173 | 4971 | 172 | 0.00600 | 174 | 3405 | 173 | 0.00600 |
| 175 | 3525 | 174 | 0.00600 | 176 | 745 | | 0.00600 |
| 177 | 6047 | 176 | 0.00550 | 178 | 3764 | | 0.00550 |
| 179 | 4815 | | 0.00550 | 180 | 16255 | 182 | 0.00550 |
| 181 | 6644 | 182 | 0.00550 | 182 | 4366 | 183 | 0.00550 |
| 183 | 2817 | 184 | 0.00550 | 184 | 2069 | | 0.00550 |
| 185 | 1608 | | 0.00550 | 186 | 1748 | | 0.00550 |
| 187 | 1442 | 186 | 0.00550 | 188 | 1180 | 187 | 0.00550 |
| 189 | 23422 | 188 | 0.00550 | 190 | 7127 | | 0.00500 |
| 191 | 9455 | 190 | 0.00500 | 192 | 8815 | 191 | 0.00500 |
| 193 | 7229 | | 0.00480 | 194 | 3628 | | 0.00480 |
| 195 | 1294 | | 0.00480 | 196 | 1388 | | 0.00480 |
| 197 | 7722 | | 0.00480 | 198 | 1078 | | 0.00480 |
| 199 | 16791 | 198 | 0.00480 | 200 | 16052 | | 0.00480 |
| 201 | 3509 | | 0.00480 | 202 | 1066 | | 0.00480 |
| 203 | 1148 | 202 | 0.00480 | 204 | 1144 | | 0.00480 |

Figure 5A

| Basic Memory depth value | Number of iterations | Time gap to failure | Error limit | Memory depth | Number of iterations | Time gap to failure | Error limit |
|---|---|---|---|---|---|---|---|
| 205 | 952 |  | 0.00480 | 206 | 1044 |  | 0.00480 |
| 207 | 971 |  | 0.00480 | 208 | 1000 |  | 0.00480 |
| 209 | 905 |  | 0.00480 | 210 | 948 |  | 0.00480 |
| 215 | 1083 |  | 0.00480 | 216 | 809 |  | 0.00480 |
| 217 | 860 |  | 0.00480 | 218 | 986 |  | 0.00480 |
| 219 | 7322 |  | 0.00440 | 220 | 17102 |  | 0.00440 |
| 221 | 4827 | 220 | 0.00446 | 222 | 4475 | 221 | 0.00446 |
| 223 | 3205 |  | 0.00446 | 224 | 5606 |  | 0.00440 |
| 225 | 4611 | 224 | 0.00440 | 226 | 3945 | 225 | 0.00440 |
| 227 | 2153 |  | 0.00440 | 228 | 2272 | 227 | 0.00440 |
| 229 | 5954 |  | 0.00430 | 230 | 5335 |  | 0.00430 |
| 231 | 5085 |  | 0.00430 | 232 | 3595 |  | 0.00430 |
| 233 | 2813 |  | 0.00430 | 234 | 3794 |  | 0.00430 |
| 235 | 3768 |  | 0.00430 | 236 | 4665 |  | 0.00430 |
| 237 | 2264 |  | 0.00430 | 238 | 1692 |  | 0.00430 |
| 239 | 3276 |  | 0.00420 | 240 | 2508 |  | 0.00420 |
| 241 | 3177 |  | 0.00420 | 242 | 8006 |  | 0.00410 |
| 243 | 7335 |  | 0.00410 | 244 | 4838 |  | 0.00400 |
| 245 | 7591 |  | 0.00400 | 246 | 6459 |  | 0.00400 |
| 247 | 3937 |  | 0.00400 | 248 | 7386 |  | 0.00400 |
| 249 | 6539 |  | 0.00400 | 250 | 6478 |  | 0.00370 |
| 251 | 8546 | 250 | 0.00370 | 252 | 2525 | 251 | 0.00370 |
| 253 | 1954 |  | 0.00370 | 254 | 4289 |  | 0.00370 |
| 255 | 19725 | 254 | 0.00370 | 256 | 2606 |  | 0.00370 |
| 257 | 2387 | 256 | 0.00370 | 258 | 1266 |  | 0.00370 |
| 259 | 5095 |  | 0.00360 | 260 | 1676 |  | 0.00360 |
| 261 | 15639 |  | 0.00340 | 262 | 2789 |  | 0.00340 |
| 263 | 38769 | 262 | 0.00340 | 264 | 2399 | 263 | 0.00340 |
| 265 | 8224 |  | 0.00340 | 266 | 8448 |  | 0.00340 |
| 267 | 17776 |  | 0.00340 | 268 | 21181 |  | 0.00340 |
| 269 | 13347 |  | 0.00340 | 270 | 9165 |  | 0.00340 |
| 271 | 33439 |  | 0.00340 | 272 | 38846 | 274 | 0.00330 |
| 273 | 9066 |  | 0.00330 | 274 | 8320 |  | 0.00330 |
| 275 | 8744 |  | 0.00320 | 276 | 50666 |  | 0.00310 |
| 277 | 26842 |  | 0.00310 | 278 | 19987 |  | 0.00310 |
| 279 | 8414 |  | 0.00310 | 280 | 5249 |  | 0.00310 |
| 281 | 3948 |  | 0.00290 | 282 | 7974 |  | 0.00280 |

Figure 5A*(continued)*

| Basic Memory depth value | Number of iterations | Time gap to failure | Error limit | Memory depth | Number of iterations | Time gap to failure | Error limit |
|---|---|---|---|---|---|---|---|
| 283 | 9116 | | 0.00270 | 284 | 9600 | | 0.00270 |
| 285 | 5315 | | 0.00260 | 286 | 3079 | | 0.00260 |
| 287 | 22914 | | 0.00240 | 288 | 35529 | | 0.00250 |
| 289 | 26922 | | 0.00230 | 290 | 39783 | | 0.00230 |
| 297 | 4866 | | 0.00200 | 298 | 13849 | 299 | 0.00190 |
| 299 | 48966 | | 0.00190 | 300 | 26392 | | 0.00190 |
| 301 | 35244 | | 0.00180 | 302 | 16941 | | 0.00180 |
| 303 | 6173 | | 0.00200 | 304 | 6049 | | 0.00210 |
| 305 | 9377 | | 0.00210 | 306 | 5249 | | 0.00200 |
| 307 | 14659 | | 0.00176 | 308 | 40066 | | 0.00180 |
| 309 | 52239 | | 0.00180 | 310 | 13532 | | 0.00180 |
| 311 | 4896 | | 0.00180 | 312 | 2552 | | 0.00180 |
| 313 | 4290 | | 0.00168 | 314 | 61662 | | 0.00168 |
| 315 | 14504 | | 0.00180 | 316 | 23579 | 315 | 0.00180 |
| 317 | 989 | | 0.00150 | 318 | 2658 | | 0.00161 |
| 319 | 15565 | | 0.00180 | 320 | 16672 | | 0.00180 |
| 321 | 5862 | | 0.00160 | 322 | 3444 | | 0.00140 |
| 323 | 17377 | | 0.00140 | 324 | 5011 | | 0.00140 |
| 325 | 968 | | 0.00140 | 326 | 1468 | | 0.00140 |
| 327 | 6432 | | 0.00180 | 328 | 25759 | | 0.00160 |
| 329 | 5994 | | 0.00160 | 330 | 21999 | | 0.00141 |
| 331 | 59245 | | 0.00215 | 332 | 638 | | 0.00140 |
| 333 | 761 | | 0.00100 | 334 | 150 | | 0.00600 |
| 335 | 9790 | | 0.00180 | 336 | 531 | | 0.00650 |
| 337 | 201 | | 0.00500 | 338 | 193 | | 0.00350 |
| 339 | 135 | | 0.00400 | 340 | 15701 | | 0.00200 |
| 341 | 22449 | | 0.00160 | 342 | 54150 | | 0.00140 |
| 343 | 61978 | | 0.00120 | 344 | 89977 | | 0.00100 |
| 345 | 262 | | 0.00600 | 346 | 33 | | 0.00550 |
| 347 | 23 | | 0.00550 | 348 | 83 | | 0.00550 |
| 349 | 52 | | 0.00400 | 350 | 19 | | 0.00350 |
| 351 | 29 | | 0.00480 | 352 | 1189 | | 0.00300 |
| 353 | 11023 | | 0.00324 | 354 | 4860 | 353 | 0.00324 |
| 355 | 1674 | 356 | 0.00340 | 356 | 8372 | 357 | 0.00260 |
| 357 | 5629 | | 0.00320 | 358 | 106 | | 0.00430 |
| 359 | 136 | | 0.00300 | 360 | 43 | | 0.00340 |
| 361 | 2006 | | 0.00340 | 362 | 1033 | | 0.00234 |

Figure 5A*(continued)*

| Basic Memory depth value | Number of iterations | Time gap to failure | Error limit | Memory depth | Number of iterations | Time gap to failure | Error limit |
|---|---|---|---|---|---|---|---|
| 363 | 73 | | 0.00260 | 364 | 1606 | | 0.00360 |
| 365 | 1344 | | 0.00360 | 366 | 2321 | | 0.00360 |
| 367 | 546 | | 0.00360 | 368 | 949 | 369 | 0.00360 |
| 369 | 1276 | | 0.00360 | 370 | 973 | 369 | 0.00360 |
| 371 | 4511 | 372 | 0.00260 | 372 | 15244 | | 0.00260 |
| 373 | 2458 | 374 | 0.00260 | 374 | 3665 | | 0.00260 |
| 385 | 1285 | 384 | 0.00274 | 386 | 5983 | | 0.00274 |
| 387 | 13019 | 386 | 0.00320 | 388 | 6107 | 389 | 0.00320 |
| 389 | 2495 | 390 | 0.00320 | 390 | 1850 | | 0.00300 |
| 391 | 2721 | | 0.00300 | 392 | 1954 | | 0.00300 |
| 393 | 1828 | 392 | 0.00300 | 394 | 3116 | | 0.00300 |
| 395 | 798 | | 0.00300 | 396 | 1347 | | 0.00300 |
| 397 | 717 | | 0.00300 | 398 | 1169 | 399 | 0.00300 |
| 399 | 4998 | | 0.00300 | 400 | 1659 | | 0.00280 |
| 401 | 985 | | 0.00280 | 402 | 1081 | 401 | 0.00280 |
| 403 | 2196 | | 0.00220 | 404 | 2431 | | 0.00215 |
| 405 | 2726 | | 0.00215 | 406 | 4188 | | 0.00215 |
| 407 | 2435 | 408 | 0.00215 | 408 | 2465 | 409 | 0.00215 |
| 409 | 3250 | 408 | 0.00215 | 410 | 1722 | | 0.00215 |
| 411 | 4359 | | 0.00190 | 412 | 3502 | | 0.00190 |
| 413 | 2626 | | 0.00190 | 414 | 2463 | | 0.00190 |
| 415 | 901 | | 0.00550 | 416 | 549 | 418 | 0.00550 |
| 417 | 1649 | 418 | 0.00300 | 418 | 1456 | 417 | 0.00260 |
| 419 | 857 | 420 | 0.00260 | 420 | 2654 | 422 | 0.00213 |
| 421 | 6114 | 422 | 0.00213 | 422 | 18510 | | 0.00213 |
| 423 | 3885 | 422 | 0.00213 | 424 | 15889 | 423 | 0.00213 |
| 425 | 4650 | | 0.00200 | 426 | 1906 | 427 | 0.00220 |
| 427 | 438 | | 0.00260 | 428 | 3460 | 427 | 0.00260 |
| 429 | 1166 | 428 | 0.00260 | 430 | 1525 | 429 | 0.00260 |
| 431 | 3848 | | 0.00220 | 432 | 1778 | 433 | 0.00260 |
| 433 | 1536 | | 0.00260 | 434 | 1510 | 435 | 0.00232 |
| 435 | 14176 | | 0.00232 | 436 | 3910 | 435 | 0.00232 |
| 437 | 5768 | 436 | 0.00232 | 438 | 2046 | 439 | 0.00232 |
| 439 | 1816 | | 0.00232 | 440 | 23942 | 439 | 0.00290 |
| 441 | 4975 | 440 | 0.00290 | 442 | 5336 | | 0.00313 |
| 443 | 1647 | | 0.00355 | 444 | 2864 | 446 | 0.00391 |

Figure 5A*(continued)*

| Basic Memory depth value | Number of iterations | Time gap to failure | Error limit | Memory depth | Number of iterations | Time gap to failure | Error limit |
|---|---|---|---|---|---|---|---|
| 445 | 6586 | 447 | 0.00370 | 446 | 2468 | 447 | 0.00411 |
| 447 | 3772 | 449 | 0.00441 | 448 | 5727 | 447 | 0.00441 |
| 449 | 2616 | 448 | 0.00441 | 450 | 1435 | | 0.00360 |
| 451 | 8778 | | 0.00360 | 452 | 2651 | 453 | 0.00360 |
| 453 | 1296 | | 0.00360 | 454 | 931 | 455 | 0.00360 |
| 455 | 222 | | 0.00550 | 456 | 1203 | 455 | 0.00370 |
| 457 | 721 | | 0.00370 | 458 | 862 | | 0.00370 |
| 459 | 6860 | | 0.00370 | 460 | 1484 | 459 | 0.00311 |
| 475 | 3006 | 474 | 0.00280 | 476 | 3481 | 475 | 0.00280 |
| 477 | 2598 | | 0.00280 | 478 | 1689 | 477 | 0.00280 |
| 479 | 2744 | 478 | 0.00280 | 480 | 6560 | 479 | 0.00230 |
| 481 | 6613 | 480 | 0.00230 | 482 | 6678 | 481 | 0.00230 |
| 483 | 9742 | 485 | 0.00230 | 484 | 7068 | 483 | 0.00230 |
| 485 | 6608 | 486 | 0.00230 | 486 | 13471 | 485 | 0.00230 |
| 487 | 3256 | 488 | 0.00270 | 488 | 1757 | 487 | 0.00270 |
| 489 | 3883 | 490 | 0.00270 | 490 | 1129 | | 0.00270 |
| 491 | 3164 | 490 | 0.00240 | 492 | 6425 | | 0.00240 |
| 493 | 3143 | | 0.00240 | 494 | 7854 | 493 | 0.00210 |
| 495 | 11848 | 497 | 0.00210 | 496 | 8184 | | 0.00210 |
| 497 | 11794 | | 0.00210 | 498 | 11133 | 497 | 0.00210 |
| 499 | 16459 | 500 | 0.00210 | 500 | 7144 | 499 | 0.00210 |
| 505 | 15934 | | 0.00210 | 510 | 9935 | 510 | 0.00210 |
| 515 | 10108 | 516 | 0.00210 | 520 | 6931 | 521 | 0.00210 |
| 525 | 5550 | 526 | 0.00190 | 530 | 12471 | | 0.00190 |
| 535 | 5410 | | 0.00190 | 540 | 5955 | 539 | 0.00190 |
| 545 | 7827 | 544 | 0.00190 | 550 | 4468 | 551 | 0.00190 |
| 555 | 2102 | 554 | 0.00175 | 560 | 4266 | 590 | 0.00180 |
| 565 | 8532 | | 0.00155 | 570 | 6236 | | 0.00190 |
| 575 | 3082 | | 0.00190 | 580 | 2600 | | 0.00170 |
| 585 | 2142 | | 0.00190 | 590 | 5553 | 592 | 0.00190 |
| 595 | 2136 | | 0.00190 | 600 | 692 | 599 | 0.00220 |

Figure 5A*(continued)*

| Basic Memory depth value | Number of iterations | Time gap to failure | Error limit | Memory depth | Number of iterations | Time gap to failure | Error limit |
|---|---|---|---|---|---|---|---|
| 605 | 1153 |  | 0.00230 | 610 | 1096 | 611 | 0.00230 |
| 615 | 1135 | 614 | 0.00230 | 620 | 1017 | 619 | 0.00220 |
| 625 | 4139 | 626 | 0.00190 | 630 | 2446 |  | 0.00190 |
| 635 | 2248 |  | 0.00190 | 640 | 3115 | 641 | 0.00230 |
| 645 | 2356 | 646 | 0.00230 | 650 | 1644 | 649 | 0.00230 |
| 655 | 1957 | 654 | 0.00210 | 660 | 5111 | 659 | 0.00210 |
| 665 | 3218 | 667 | 0.00210 | 670 | 2418 | 669 | 0.00210 |
| 675 | 2812 |  | 0.00163 | 680 | 3674 | 679 | 0.00163 |
| 685 | 2052 |  | 0.00190 | 690 | 1728 |  | 0.00190 |
| 695 | 1180 |  | 0.00212 | 700 | 2961 | 701 | 0.00212 |
| 705 | 2274 |  | 0.00190 | 710 | 1112 | 711 | 0.00212 |
| 715 | 1663 | 717 | 0.00190 | 720 | 1559 |  | 0.00212 |
| 835 | 1454 |  | 0.00160 | 840 | 1195 |  | 0.00180 |
| 845 | 1617 | 846 | 0.00162 | 850 | 1335 |  | 0.00230 |
| 855 | 792 |  | 0.00230 | 860 | 1613 | 861 | 0.00190 |
| 865 | 1475 |  | 0.00163 | 870 | 3250 |  | 0.00140 |
| 875 | 792 |  | 0.00185 | 880 | 752 |  | 0.00190 |
| 885 | 918 |  | 0.00210 | 890 | 6136 |  | 0.00170 |
| 895 | 6915 | 897 | 0.00139 | 900 | 6252 | 899 | 0.00140 |
| 905 | 1438 | 904 | 0.00186 | 910 | 123 |  | 0.00190 |
| 915 | 345 | 914 | 0.00249 | 920 | 2756 |  | 0.00181 |
| 925 | 1367 | 927 | 0.00227 | 930 | 1977 |  | 0.00227 |
| 935 | 871 | 934 | 0.00227 | 940 | 1756 | 941 | 0.00180 |
| 945 | 4046 |  | 0.00140 | 950 | 3235 | 951 | 0.00180 |
| 955 | 1671 | 956 | 0.00170 | 960 | 6012 |  | 0.00130 |
| 965 | 6336 |  | 0.00130 | 970 | 1877 | 969 | 0.00160 |
| 975 | 2672 | 974 | 0.00150 | 980 | 1742 | 982 | 0.00180 |
| 985 | 4808 |  | 0.00140 | 990 | 1687 |  | 0.00170 |
| 995 | 1437 |  | 0.00170 | 1000 | 2259 |  | 0.00150 |

| Sl. No. | Composite Memory depth value | Composite sequence | Number of iterations | Time gap to failure | Error threshold |
|---|---|---|---|---|---|
| 1 | 110 | 20-30-60-20-30 | 824 | | 0.0140 |
| 2 | 120 | 20-30-70-20-30 | 1293 | | 0.0100 |
| 3 | 150 | 30-40-80-30-40 | 2630 | | 0.0090 |
| 5 | 165 | 50-55-60-50-55 | 46043 | | 0.0080 |
| 4 | 180 | 30-40-110-30-40 | 14434 | 113 | 0.0100 |
| 6 | 210 | 20-30-50-110-20-30-50 | 4867 | | 0.0087 |
| 8 | 230 | 20-30-60-120-20-30-60 | 28318 | | 0.0065 |
| 7 | 240 | 10-30-60-140-10-30-60 | 9256 | 142 | 0.0078 |
| 9 | 250 | 10-30-70-140-10-30-70 | 8537 | | 0.0077 |
| 10 | 260 | 20-30-50-160-20-30-50 | 19059 | | 0.0057 |
| 12 | 270 | 10-30-60-170-10-30-60 | 28398 | 169 | 0.0079 |
| 11 | 280 | 10-30-50-190-10-30-50 | 56662 | | 0.0053 |
| 14 | 280 | 20-50-60-150-20-50-60 | 36203 | | 0.0067 |
| 13 | 290 | 10-30-60-190-10-30-60 | 23508 | | 0.0072 |
| 15 | 310 | 20-30-60-200-20-30-60 | 84056 | | 0.0048 |
| 16 | 320 | 20-30-70-200-20-30-70 | 13701 | | 0.0084 |
| 18 | 330 | 30-40-80-180-30-40-80 | 70720 | | 0.0061 |
| 17 | 350 | 20-30-60-240-20-30-60 | 37812 | 239 | 0.0073 |
| 20 | 350 | 30-40-80-200-30-40-80 | 35001 | 182 | 0.0080 |

Figure 6A

| Sl. No. | Composite Memory depth value | Composite sequence | Number of iterations | Time gap to failure | Error threshold |
|---|---|---|---|---|---|
| 19 | 390 | 20-30-60-280-20-30-60 | 51349 | | 0.0056 |
| 21 | 475 | 30-40-80-325-30-40-80 | 29334 | 327 | 0.0100 |
| 22 | 505 | 30-40-110-325-30-40-110 | 5907 | 329 | 0.0080 |
| 23 | 620 | 50-90-130-350-50-90-130 | 5006 | 354 | 0.0100 |
| 24 | 670 | 70-110-130-360-70-110-130 | 8520 | 367 | 0.0100 |
| 25 | 715 | 160-230-325-160-230 | 2914 | 329 | 0.0080 |
| 26 | 750 | 160-230-360-160-230 | 7011 | 369 | 0.0080 |
| 27 | 810 | 170-260-380-170-260 | 3002 | 372 | 0.0080 |
| 28 | 810 | 190-260-360-190-260 | 5004 | 382 | 0.0080 |
| 30 | 970 | 150-200-250-370-150-200-250 | 10212 | 392 | 0.0100 |
| 31 | 1170 | 200-250-300-420-200-250-300 | 20000 | 423 | 0.0085 |
| 33 | 1240 | 375-390-475-375-390 | 15000 | 475 | 0.0080 |
| 34 | 1248 | 377-393-478-377-393 | 15000 | 477 | 0.0080 |
| 35 | 1570 | 300-350-400-520-300-350-400 | 35000 | 520 | 0.0080 |
| 36 | 1770 | 350-400-450-570-350-400-450 | 35000 | | 0.008 |
| 37 | 2170 | 450-500-550-670-450-500-550 | 35000 | 671 | 0.008 |
| 38 | 2970 | 650-700-750-870-650-700-750 | 40000 | 878 | 0.008 |
| 39 | 3150 | 1000-1050-1100-1000-1050 | 40000 | 1106 | 0.008 |

Figure 6A *(continued)*

| Sl. No. | Composite Memory depth value | Composite sequence | Number of iterations | Time gap to failure | Error threshold |
|---|---|---|---|---|---|
| 1 | 820 | 200-260-360-190-260 | 35010 | 368 | 0.0080 |
| 2 | 1180 | 210-250-300-420-200-250-300 | 25000 | 436 | 0.0080 |

1 0 0 0 0 0 0 0 0 1 0 0 0 0 0 0 0 0 0 0 0 0 0 1

(1) 1 0 0 0 0 0 0 0 0 1 0 0 0 0 0 0 0 0 0 1
(2) 1 0 0 0 0 0 0 0 0 1 0 0 0 0 0 0 0 0 0 0 1
(3) 1 0 0 0 0 0 0 0 0 1 0 0 0 0 0 0 0 0 0 0 0 1
(4) 1 0 0 0 0 0 0 0 0 1 0 0 0 0 0 0 0 0 0 0 0 0 1
(5) 1 0 0 0 0 0 0 0 0 1 0 0 0 0 0 0 0 0 0 0 0 0 0 1
(6) 1 0 0 0 0 0 0 0 0 1 0 0 0 0 0 0 0 0 0 0 0 0 0 0 1

METHOD FOR MACHINE FAILURE PREDICTION USING MEMORY DEPTH VALUES

FIELD OF INVENTION

The invention relates to machine failure prediction techniques, especially, a method and system for machine failure prediction involving very large temporal dependencies, typically more than 100 time steps.

BACKGROUND

It is of high importance to accurately predict machine failures/faults which occur very rarely, i.e. after a very long time gap, as such prediction allows the user to take preventive actions to avoid the potential machine failures. This is particularly important for equipment which is used to provide basic services such as tele-communication, transportation etc.

Various methods have been used to predict machine failures based on history of machine failures and additional causal parameters like ambient temperature, humidity, overload and age of the equipment etc. In general, these methods predict machine failures based on either statistical or artificial intelligence (AI) techniques. It is much easier to predict a machine failure which occurs after a few time steps e.g. 10 time steps. However, as the inter-failure gap increases, the existing methods, e.g. methods using hidden Markov model or genetic algorithm, cannot provide correct and accurate predictions.

Recurrent Neural Network (RNN) with back propagation of errors as training method has been used for machine condition monitoring and diagnosis. It will be understood by a person skilled in the art that the RNN can also be used for machine failures prediction since machine failure prediction can be treated as a sequence modelling process. However, the RNN based methods with random initial weights using Back propagation through time (BPTT) cannot handle machine failure prediction with a long inter-failure gap, e.g. more than 15 time steps, mainly due to vanishing gradient or exploding gradient problem. To overcome this difficulty, specialized architectures have been proposed, however, use of specialized architecture will increase complexity and sometimes these architectures can only work in special situations.

SUMMARY OF INVENTION

Embodiments of the invention provide a machine failure prediction solution which can handle very long time gaps between two successive failures, e.g. more than 1000 time steps.

According to one aspect of the invention, a method for machine failure prediction is provided. The method comprises:

identifying, by a first processor in a first computer system, a plurality of basic memory depth values based on a composite sequence of a machine failure history;

ascertaining, by the first processor, a set of weight values for at least one of the plurality of basic memory depth values according to a pre-stored table which is stored in a memory and includes a plurality of mappings wherein each mapping relates a basic memory depth value to one set of weight values; and predicting, by the first processor, a future failure using a Back Propagation Through Time (BPTT) trained Recurrent Neural Network (RNN) based on the ascertained weight values for the at least one of the plurality of basic memory depth values, wherein a first set of weight values related to a first basic memory depth value in the pre-stored table is ascertained based on a second set of weight values related to a second basic memory depth value, wherein the second basic memory depth value is less than the first basic memory depth value by a predetermined value.

According to a second aspect of the invention, a system for machine failure prediction is provided. The system comprises: a first processor and a memory communicably coupled thereto, wherein the first memory is configured to store data to be executed by the first processor, wherein the first processor is configured to identify a plurality of basic memory depth values based on a machine failure history;

ascertain a set of weight values for at least one of the plurality of basic memory depth values according to a pre-stored table which is stored in a memory and includes a plurality of mappings wherein each mapping relates a basic memory depth value to one set of weight values; and predict a future failure using a Back Propagation Through Time (BPTT) trained Recurrent Neural Network (RNN) based on the ascertained weight values for the at least one of the plurality of basic memory depth values, wherein a first set of weight values related to a first basic memory depth value in the pre-stored table is ascertained based on a second set of weight values related to a second basic memory depth value, wherein the second basic memory depth value is less than the first basic memory depth value by a predetermined value.

Embodiments of the invention use a standard Back Propagation Through Time (BPTT) trained Recurrent Neural Network (RNN) and an iterative method to solve machine failure prediction problems. These problems have very complex composite sequences of machine failure history and the composite sequences involve very large time gaps of machine failures. The iterative method is used to ascertain weight values of RNN related to elementary sequences or initial weight values of RNN related to a composite sequence. With this iterative method, the initial weight values of RNN ascertained for solving a complex machine failure prediction problem are close to the final weight values when convergence occurs. Thus, the vanishing gradient or exploring gradient problem mentioned above would be effectively avoided. With the method for machine failure prediction provided in the embodiments of the invention, even very large time gap machine failure prediction problems, e.g. memory depth is more than 3000 time steps and inter failure gap is more than 1000 time steps, can be solved in an acceptable time period.

BRIEF DESCRIPTION OF THE DRAWINGS

The invention will be described in detail with reference to the accompanying drawings, in which:

FIG. 5A is a table illustrating the basic memory depth values 10-1000, and the corresponding minimum number of iterations for epochs for convergence, the predetermined error limit/threshold value and time gap for failure;

FIG. 5B is a table illustrating weight values related to the initial memory depth value 10 when convergence occurs;

FIG. 5C is a table illustrating a set of weight values ascertained for an elementary problem with a basic memory depth value 12 when convergence occurs;

FIG. 6A is a table illustrating a group of composite sequences which are predicted by using the method proposed in FIG. 1;

DETAILED DESCRIPTION OF EMBODIMENTS OF THE INVENTION

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention.

As mentioned above, in embodiments of the invention, a solution for machine failure prediction involving very large temporal dependencies is provided. This solution uses a standard BPTT trained RNN and an iterative method to solve a complex composite machine failure prediction problem.

FIG. 1A is a flowchart illustrating a method 100 for predicting a machine failure according to a first embodiment of the invention.

In block 101, a processor in a computer identifies a plurality of basic memory depth values based on a composite sequence of a machine failure history.

Figure 1:
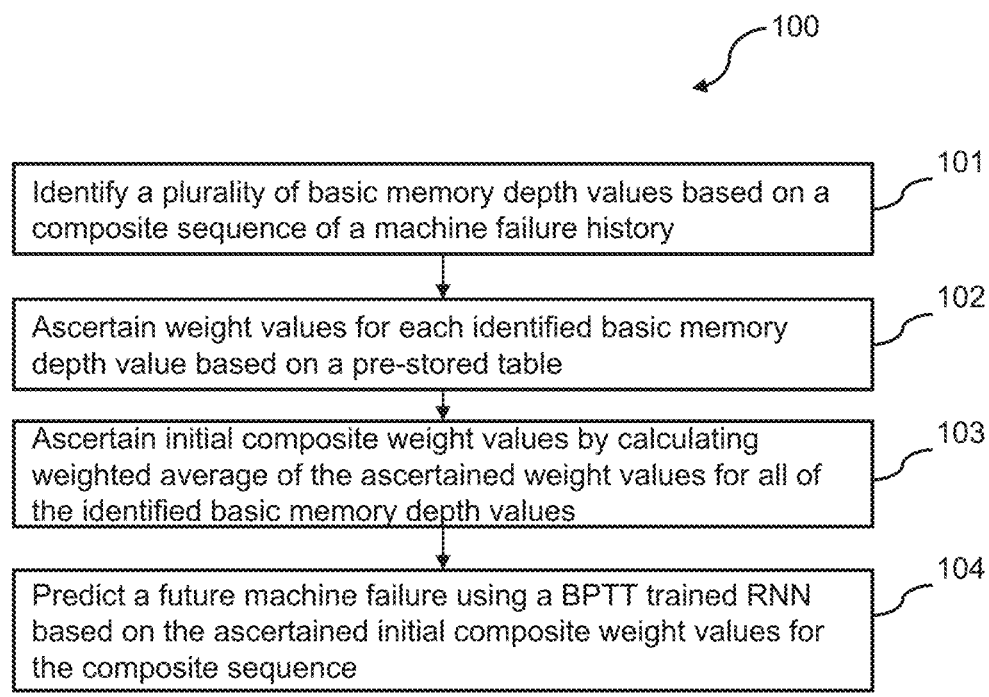
FIG. 1A is a flowchart illustrating a method for predicting a machine failure according to a first embodiment of the invention.
FIG. 1B shows an example of a composite sequence of a machine failure history.
FIG. 1C shows as an example of a composite sequence including two basic memory depth values 5 and 6.
Figure 1B:
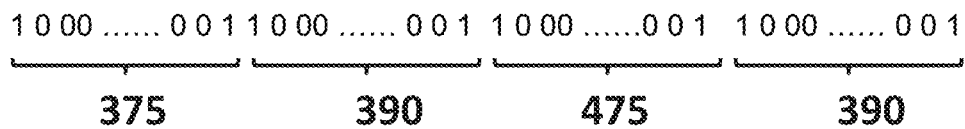

FIG. 1B shows an example of a composite sequence of a machine failure history. In this sequence, 0 represents negative failure indicator, i.e. there is no machine failure; 1 represents positive failure indicator, i.e. there is a machine failure. The composite sequence includes a plurality of different basic memory depth value. Each basic memory depth value refers to the number of zeroes between two successive positive failure indicators. As shown in FIG. 1(b), in this example, the composite sequence includes three basic memory depth values: 375, 390 and 475.

In addition, it is to be appreciated by a skilled person in the art that the composite sequence of a machine failure history may be inputted by a user.

In block 102, the processor in the computer ascertains weight values for each identified basic memory depth value based on a pre-stored table. Typically, the processor directly retrieves the weight values for each identified basic memory depth value from the pre-stored table.

The pre-stored table includes a plurality of mappings. Each of the mappings relates a basic memory depth value to one set of weight values. The pre-stored table is generated using an iterative method which will be explained in detail below. In general, a first set of weight values related to a first basic memory depth value in the pre-stored table is ascertained based on a second set of weight values related to a second basic memory depth value in the pre-stored table, wherein the second basic memory depth value is less than the first basic memory depth value by a predetermined value. The predetermined value may be any integer not greater than 5. It should be noted that as the size of the pre-stored table is too big, it is not included in the description.

In block 103, the processor in the computer ascertains initial composite weight values by calculating weighted average of the ascertained weight values for all of the identified basic memory depth values.

Firstly, we will explain why the weighted average of the ascertained weight values of the basic memory depth values is a suitable estimate for ascertaining initial weight values of a composite sequence.

Figures 1C, 2:
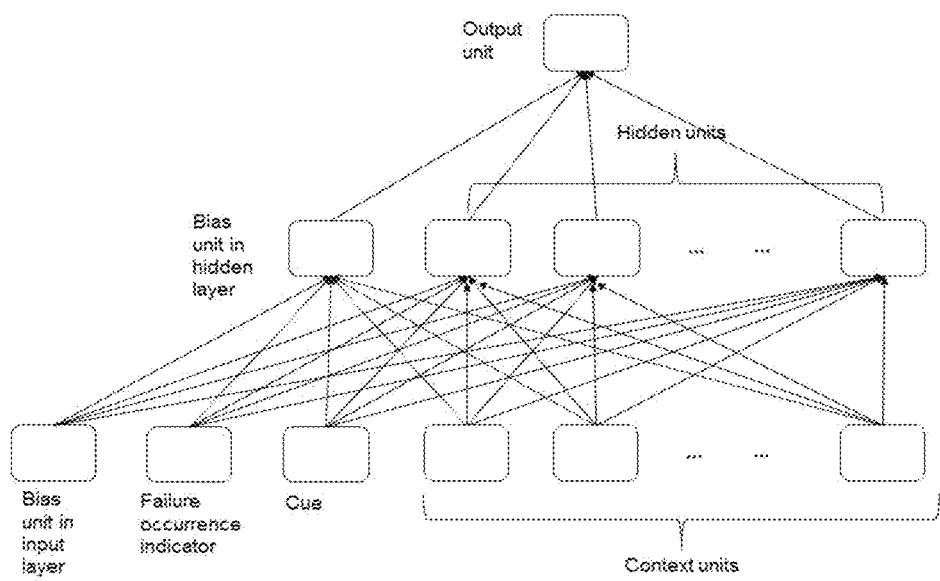
FIG. 2 illustrates the architecture of a RNN trained with Back Propagation Through Time (BPTT) used for machine failure prediction according to one embodiment of the invention.

Take the composite sequence in FIG. 1C as an example, this composite sequence includes two basic memory depth values 5 and 6. It has been found that the final weight values for modelling this composite sequence are very close to weighted average of weight values for modelling elementary sequences with basic memory depth values 5 and 6. Hence, weighted average should be a suitable estimate for ascertaining initial weight values of a composite sequence. This conclusion is of crucial importance since it allows to model arbitrarily composite sequence using weight values related to basic memory depth values. This concept is also applicable when the composite sequence contains more than 2 basic memory depth values. Since weights related to basic memory depth values can be pre-computed, initial weight values for a composite sequence can be obtained by looking up for corresponding weight values for related to basic memory depth values and then calculating weighted average of the weight values related to the basic memory depth values. Thus, the process for modelling a composite sequence would be greatly simplified.

In this embodiment, the weighted average of the ascertained basic weight values for all of the identified basic memory depth values is calculated based on the count of appearances of each identified basic memory depth value in the composite sequence, i.e. the number of appearances/occurrences of each identified basic memory depth value in the composite sequence. Assuming the weight values ascertained for the basic memory depth values 375, 390 and 475 are respectively W1, W2 and W3, the weighted average of the ascertained weight values is calculated according to the following Equation (1):

$$(W1+2*W2+W3)/4 \tag{1}$$

In block 104, the processor in the computer predicts a future machine failure using a BPTT trained RNN based on the ascertained composite weight values for the composite sequence.

FIG. 2 illustrates the architecture of a RNN trained with Back Propagation Through Time (BPTT) used for machine failure prediction according to one embodiment of the invention. Referring to FIG. 2, the RNN has multiple layers of neurons including input layer with a plurality of input units, hidden layer with a plurality of hidden units and an output layer with an output unit. In the RNN, hidden units of time period (t−1), also called state units, are also used as input at time period (t). This simply means that the network at time period (t) is fed with the earlier state of the network at time period (t−1) to ensure that current prediction is influenced by earlier actual values.

In embodiments of the invention, the RNN is used to predict machine failure only based on a failure history sequence without other inputs like performance counter, temperature, wind speed etc. In addition, cue unit in input layer is used to improve the RNN to remember long time gaps. Experiments have proved that use of cue unit can significantly reduce number of iterations for convergence.

To solve a machine failure prediction problem involving very large temporal dependencies, the number of state units to be used must be adequate for inputting the ascertained weight values. In one embodiment of the invention, before the processor runs the RNN, the processor determines the number of state units based on a maximum value of the identified basic memory depth values. In one example of the embodiment, if the maximum value of the identified basic memory depth values is not more than 350, the processor determines that the number of state units to be used is 60 units; if the maximum value of the identified memory depth values is more than 350, but not more than 1000, the processor determines that the number of state units to be used is 120 units.

Method for Generating the Pre-Stored Table

The method for generating the pre-stored table will be explained in detail below. As mentioned above, the pre-stored table is generated using an iterative method, i.e. the set of weight values related to a first basic memory depth value is ascertained based on the set of weight values which has been ascertained for a second basic memory depth value which is less than the first basic memory depth value by a predetermined value, e.g. any integer not greater than 5.

Firstly, we will explain why this iterative method can be used to effectively ascertain weight values related to a corresponding basic memory depth value.

In embodiments of the invention, a basic memory depth value corresponds to an elementary sequence/problem for machine failure prediction, i.e. each elementary sequence has a fixed basic memory depth value. It has been found that weight values of RNN for solving two elementary problems do not vary much when the basic memory depth values of the two elementary problems are close to each other. In other words, when a RNN having a specific structure is used to solve two similar elementary problems, e.g. running a first elementary sequence with a basic memory depth value 5 and a second elementary sequence with a basic memory depth value 6, a first and a second set of weight values which are used when convergence occurs are identified respectively for these two elementary sequences. It has been found that there are only minor differences between the corresponding weight values for these two elementary sequences which are being used when convergence occurs.

With this conclusion, weight values related to an elementary sequence with a very large time gap can be ascertained by using an iterative way. Specifically, weight values related to an elementary sequence with a basic memory depth value 6 can be ascertained using weight values of a RNN which can handle an elementary sequence with a basic memory depth value 5. Then, weight values for an elementary sequence with a basic memory depth value 7 can be ascertained using weight values of the RNN which can handle the elementary sequence with a basic memory depth value 6. Accordingly, weight values for an elementary sequence with a very large time gap, e.g. more than 100 time gaps, can be ascertained iteratively. It should be noted that using this method to ascertain weight values related to an elementary sequence with a very large time gap, the RNN has to remember more parameters, so the number of state units in the RNN are also to be increased.

Figure 3A:
FIG. 3A is a graph illustrating weight variation between elementary problems with basic memory depth values 225 and 230.
Figure 3B:
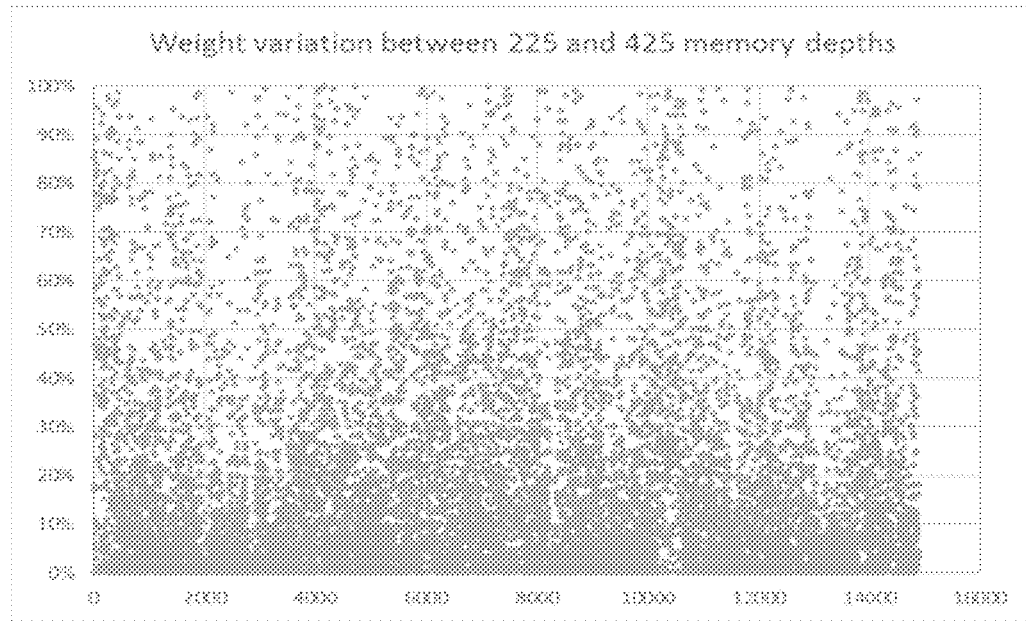
FIG. 3B is a graph illustrating weight variation between elementary problems with basic memory depth values 225 and 425.

To further prove the conclusion explained above, the weight values related to elementary problems with basic memory depth values 225 and 230 are compared as shown in FIG. 3A. In FIG. 3A, values on x-axis indicate indices of weight values and values on y-axis indicate variation percentage of weight values. Weight values are numbered by starting with 1 and moving onto the input layer from left to right. For each input unit, weight values for all connections between that input unit and all hidden units are numbered sequentially. Referring to FIG. 3A, majority of the weight values do not vary beyond 10%. In this example, 120 state units are used, the total number of input units is 123=120 (state units)+1 (unit for failure occurrence indicator)+1 (cue unit)+1 (bias in input layer), and the number of hidden units is 121=120+1 (bias in hidden layer). Accordingly, the number of weight values is 123×121=14883. As shown in FIG. 3A, only 8.93% weight values vary by more than 5% when the weight values related to the basic memory depth values 225 and 230 are compared. While as shown in FIG. 3B which is a graph illustrating weight variation between elementary problems with basic memory depth values 225 and 425, when the two basic memory depth values are not close to each other, obvious variation of weight values have been found. As shown in FIG. 3B, contrary to the situation shown in FIG. 3A, in this example, 69.09% weight values vary by more than 5%.

According to the aforementioned conclusion, the basic weight values of RNN for solving an elementary problem with a basic memory depth value n can be used as initial weight values of RNN for solving an elementary problem with a basic memory depth value n+x, wherein the value of x may be an integer not greater than 5.

Figure 4:
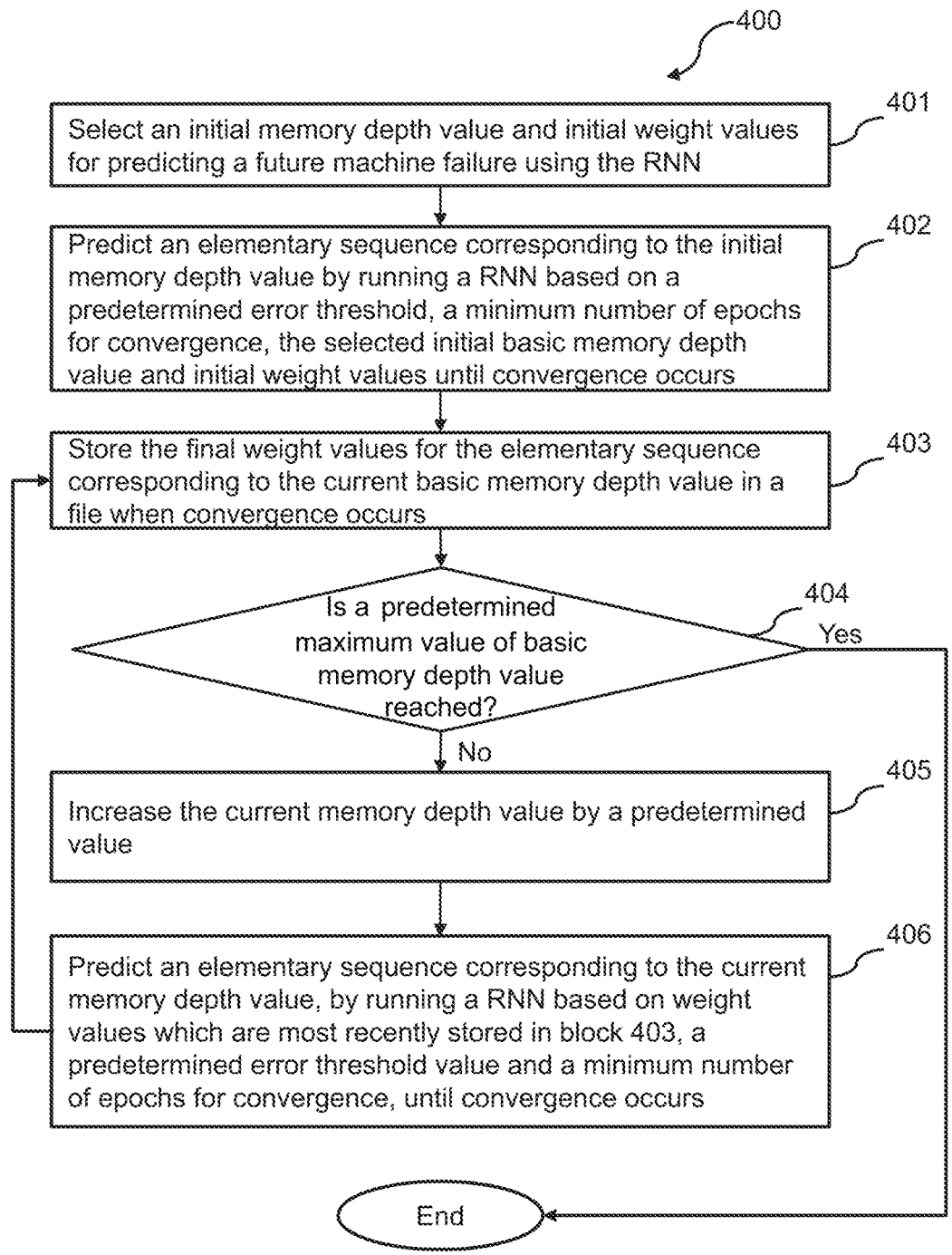
FIG. 4 is a flow chart illustrating the method for generating the pre-stored table according to one embodiment of the invention.

FIG. 4 is a flow chart illustrating the method 400 for generating the pre-stored table according to one embodiment of the invention.

In block 401, the processor in the computer selects an initial memory depth value, e.g. 10, and initial weight values, e.g. [−1.35, 1.35], for predicting a future machine failure using the RNN.

It should be noted that the processor used for generating the pre-stored table and the processor used for machine failure prediction may be provided as the same processor.

In block 402, the processor in the computer predicts an elementary sequence corresponding to the initial memory depth value, i.e. the elementary sequence with a basic memory depth value 10, by running a RNN based on a predetermined error threshold, a minimum number of epochs for convergence, the selected initial basic memory depth value and random initial weight values until convergence occurs.

It should be noted that in some cases, the minimum number of epochs for convergence may not be necessary.

FIG. 5A is a table illustrating the basic memory depth values 10-1000, and the corresponding minimum number of iterations for epochs for convergence, the predetermined error limit/threshold value and time gap for failure. It should be noted that since RNN acts as a function approximator, sometimes failure may not be predicted exactly where expected but within a small number of time gaps deviation (typically 1 to 5). The table in FIG. 5A also lists exact time gaps where next failure is predicted when there is a deviation. If there is no deviation, the corresponding value is left empty.

In block 403, the final weight values for predicting the elementary sequence corresponding to a current basic memory depth value are stored in a file when convergence occurs.

In order to solve machine failure prediction problem involving large temporal dependencies, the hidden units to be used by the RNN is 120, accordingly, the number of weight values is 123×121=14883. As the number is too big to be included in the description, a simplified example is used to illustrate the ascertained weight values according to the method proposed in embodiments of the invention.

Figure 5B:
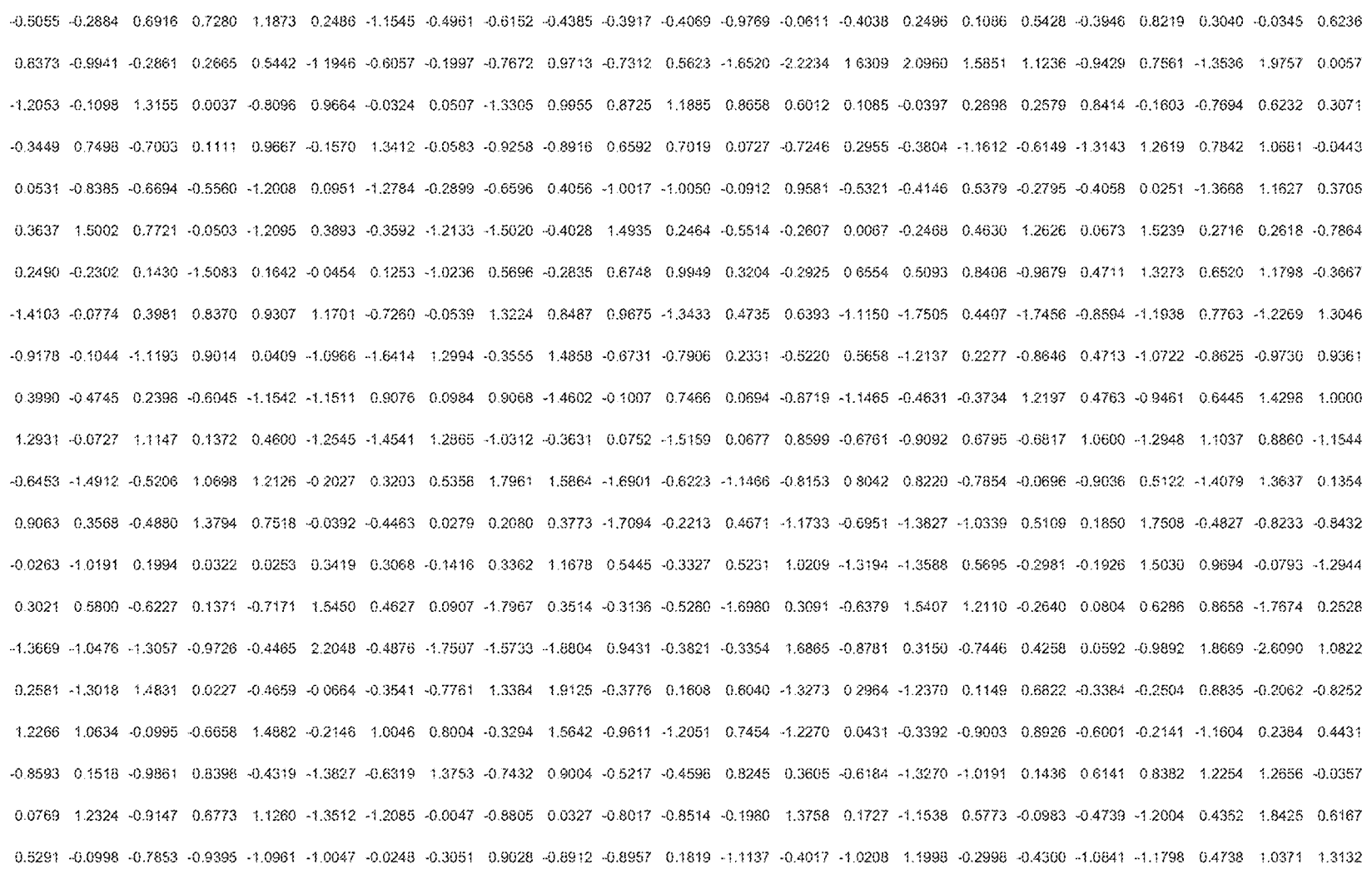

For illustration purpose only, FIG. 5B shows a table illustrating weight values related to the initial memory depth value 10 when convergence occurs. In this example, 20 hidden units are used, accordingly, the number of weight values shown in the table is 23×21=483.

In block 404, the processor in the computer determines whether a predetermined maximum value of basic memory depth value is reached, if yes, the process ends; otherwise, the flow goes to block 405.

In block 405, the current basic memory depth value is increased by a predetermined value, e.g. 1. It should be noted that in other embodiments, the predetermined value may be any integer not greater than 5.

In block 406, the processor in the computer predicts an elementary sequence corresponding to the current basic memory depth value, by running a RNN based on the set of final weight values which is most recently stored in block 403, a predetermined error threshold value and a minimum number of epochs for convergence, until convergence occurs. It should be noted that in some cases, the minimum number of epochs for convergence is not necessary. Then, the flow goes back to block 403.

Figure 5C:
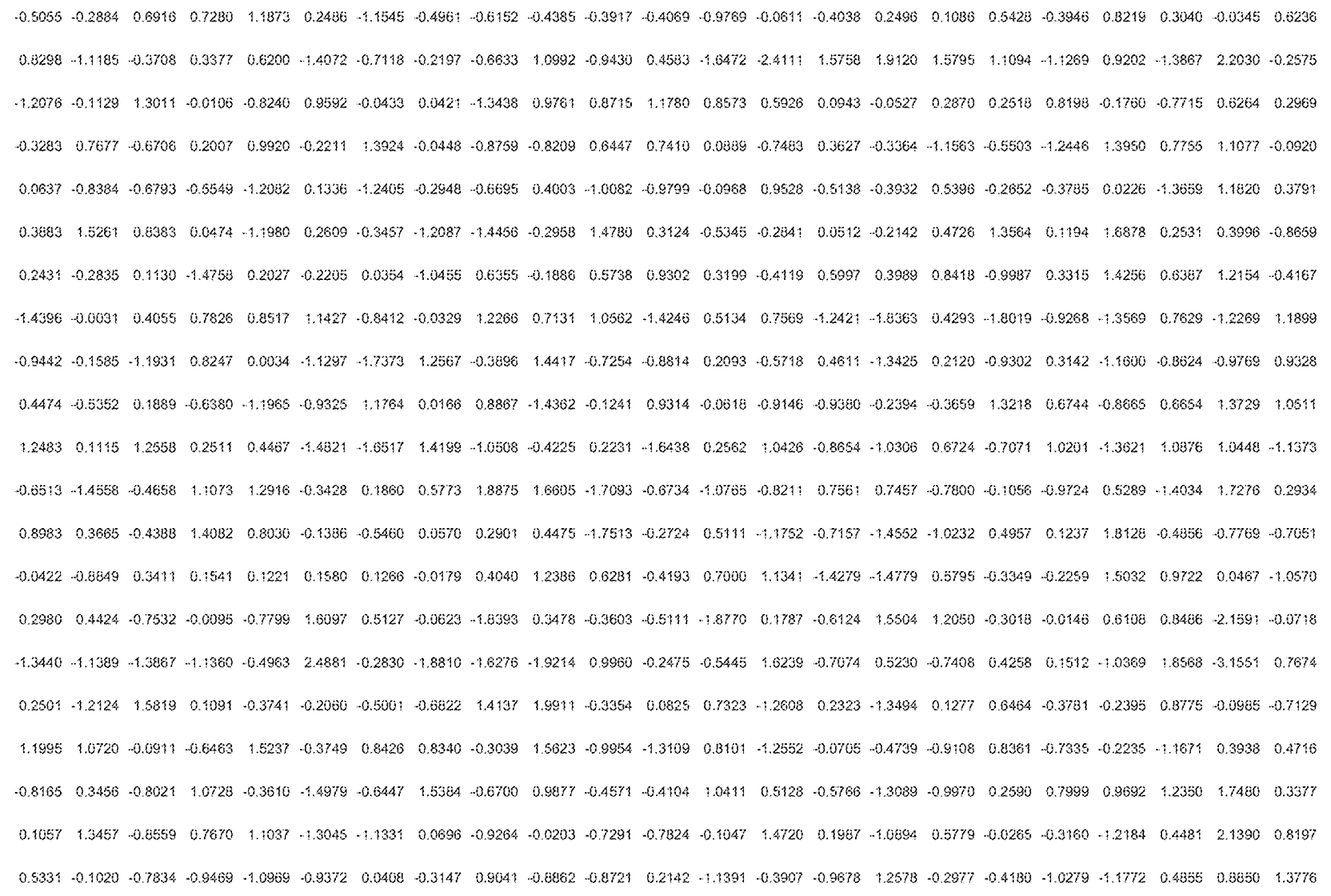

FIG. 5C shows a table illustrating a set of weight values ascertained for an elementary problem with a basic memory depth value 12 when convergence occurs. This set of weight values are ascertained based on the weight values shown in FIG. 5B for an elementary problem with a basic memory depth value 10.

Accordingly, a pre-stored table can be generated based on the iterative method above. This table includes a plurality of mappings, each mapping has a basic memory depth value and a set of corresponding basic weight values ascertained related to this basic memory depth value.

Simulation Results

FIG. 6A is a table illustrating a group of composite sequences which are predicted by using the method proposed in FIG. 1. In the table, each of the composite sequences has a perfect circular pattern. For example, the circular pattern of the composite sequence 20-30-60-20-30 is 20-30-60, accordingly, the corresponding composite memory depth value of the composite sequence is 20+30+ 60=110. For each composite sequence, the corresponding number of iterations for convergence, time gap to failure and the error limit/threshold value are listed in the table. It can be seen from the last composite sequence that the failures are predicted to happen after more than 1000 time gaps. The simulation results in the table indicate that the method proposed in the embodiments of the invention is suitable for machine failure prediction involving very large time dependencies.

Figures 6B, 7:
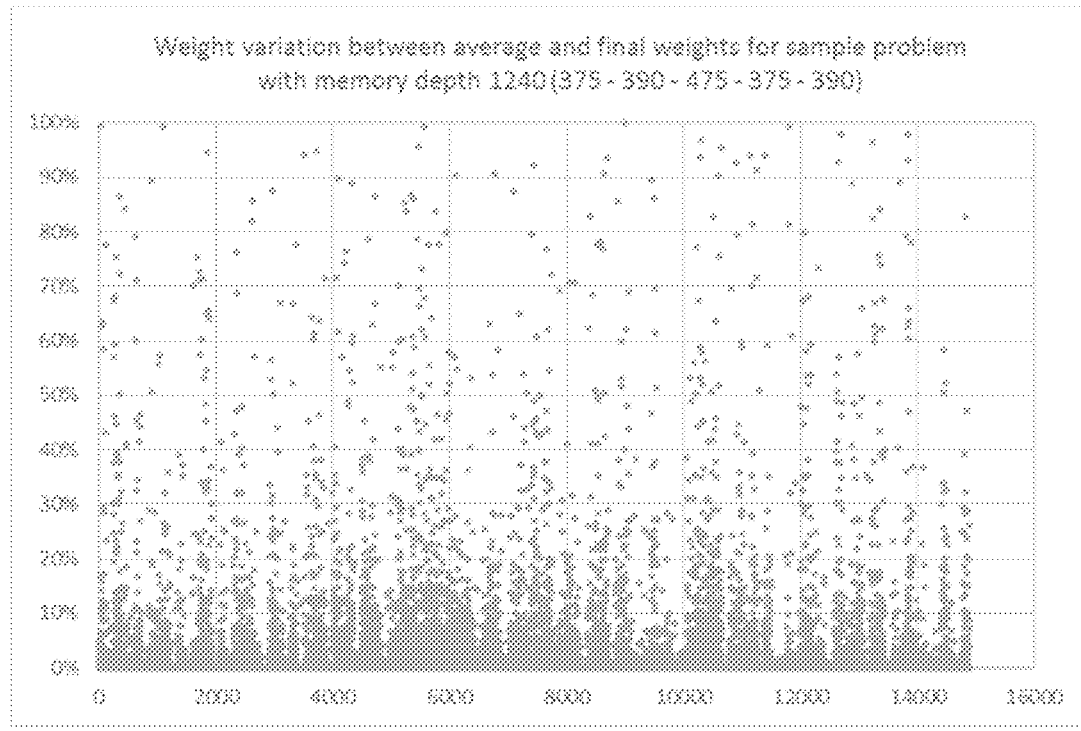
FIG. 6B is a graph in planar coordinates illustrating weight variations between calculated composite weight values and simulated composite weight values for composite sequence 375-390-475-375-390.
FIG. 7 is a table illustrating simulation results of two composite sequences with non-perfect circular pattern.

FIG. 6B is a graph in planar coordinates illustrating weight variations between composite weight values for composite sequence 375-390-475-375-390 calculated using the method proposed in FIG. 1 and the simulation results of composite weight values when convergence occurs. It has been shown in FIG. 6B that only 20.13% of the calculated weight values vary by more than 5% when compared with the corresponding simulated weight values when convergence occurs.

FIG. 7 shows a table illustrating simulation results of two composite sequences with non-perfect circular pattern. For example, the circular pattern of the composite sequence 200-260-360-190-260 is 200-260-360. However, the first value of the second circular pattern in the composite sequence is 190 instead of 200. the circular pattern of the composite sequence 210-250-300-420-200-250-300 is 210-250-300-420. However, the first value in the second circular pattern is 200 instead of 210. The simulation results shown in FIG. 7 indicate that even if the circular pattern of a composite sequence is not perfect, the method proposed by embodiments of the invention can also predict the future machine failure properly. It means that the BPTT trained RNN proposed in embodiments of the invention is not only suitable for solving machine failure prediction problem involving large memory depth, but also holds generalization property.

Figures 8A, 8B, 8C:
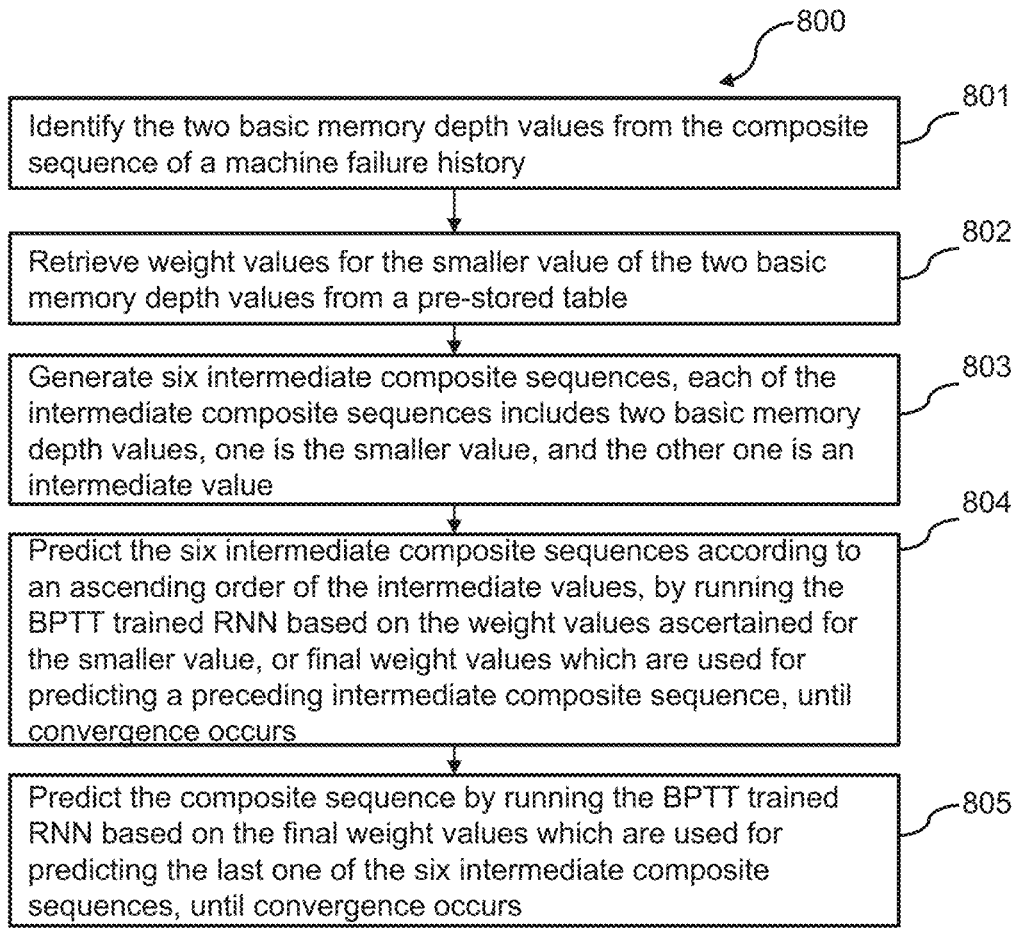
FIG. 8A is a flow chart illustrating a method for predicting machine failure according to a second embodiment of the invention.
FIG. 8B shows an example of a composite sequence.
FIG. 8C shows six intermediate composite sequences generated according to the second embodiment of the invention.

FIG. 8A is a flow chart illustrating a method for predicting machine failure according to a second embodiment of the invention. In this embodiment, the composite sequence to be predicted includes only two basic memory depth values as shown in FIG. 8B.

In block 801, a processor in a computer identifies the two basic memory depth values from the composite sequence of a machine failure history.

As shown in FIG. 8B, the composite sequence in the embodiment includes two basic memory depth values: a smaller value 8 and a larger value 15.

In block 802, the processor in the computer retrieves weight values for the smaller value 8 of the two basic memory depth values from a pre-stored table.

It should be noted that in this embodiment, the pre-stored table is generated using the iterative method mentioned above.

In block 803, the processor in the computer generated six intermediate composite sequences. Each of the intermediate composite sequences includes two basic memory depth values, one is the smaller value 8, and the other one is an intermediate value.

As shown in FIG. 8C, the six intermediate values for the six intermediate composite sequences are respectively 9, 10, 11, 12, 13, and 14.

It should be noted that the number of the intermediate composite sequences and the intermediate value for each intermediate composite sequence in this embodiment are for illustration purpose only and do not limit the scope of the invention.

In block 804, the processor in the computer predicts the six intermediate composite sequences according to an ascending order of the intermediate values, by running the BPTT trained RNN based on the weight values ascertained for the smaller value 8, or final weight values which are used for predicting a preceding intermediate composite sequence which has a smaller intermediate value, until convergence occurs.

Specifically, the weight values for the intermediate composite sequence (1) are ascertained based on the weight values for the smaller value 8 retrieved from the pre-stored table. The weight values for the intermediate composite sequence (2) are ascertained based on final weight values which are used for predicting the intermediate composite sequence (1). The final weight values are the weight values which are being used for predicting the intermediate composite sequence (1) when convergence occurs. The rest may be deduced by analogy, the weight values for the intermediate composite sequences (3) to (6) are ascertained respectively based on final weight values which are used for predicting the intermediate composite sequences (2) to (5).

In block 805, the processor in the computer predicts the composite sequence as shown in FIG. 8B by running the BPTT trained RNN based on the final weight values which are used for predicting the intermediate composite sequence (6), until convergence occurs.

It is to be appreciated by a person skilled in the art that although for convenience of explanation, the composite sequence in FIG. 8B includes two quite small basic memory depth values; the method described in FIG. 8A is easily suitable for solving a composite machine failure prediction problem which involves very large temporal dependencies. Further, the final weight values ascertained for the particular composite sequence which includes only two basic memory depth values using the method shown in FIG. 8A may be stored in the pre-stored table and used for ascertaining final weight values of a more complex composite sequence which includes the particular composite sequence.

As will be appreciated from the above, embodiments of the invention provide a method for predicting machine failures involving very large time gaps. This method uses a standard RNN trained with BPTT and an iterative method for ascertaining initial weight values to be used for predicting machine failures. It has been tested that the method disclosed in embodiments of the invention can solve a machine failure prediction problem involving very large temporal dependencies, e.g. a composite memory depth value is more than 3000 time steps and the inter failure gap is more than 1000 time steps. It takes very less time for convergence in the RNN since the RNN starts with weight values which are close to the final weight values, e.g. problems with memory depth more than 3000 time steps take no more than 40000 epochs for convergence. Further, even if the machine failure prediction problem does not follow a perfect circular pattern, which is common in real life, the method disclosed by embodiments of the invention can be used to predict a future failure properly.

As is clear from the foregoing, the present invention includes a non-transitory computer readable medium comprising computer program code for machine failure prediction, wherein the computer program code, when executed, is configured to cause a processor in a computer system perform a method as described herein.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A method of machine failure prediction, the method comprising:
determining, by at least one processor in at least one computer system, a first basic memory depth value and a second basic memory depth value based on a composite sequence of a machine failure history;
inputting, by the at least one processor, the first basic memory depth value, a first predetermined error threshold, and a first set of weight values between a first predetermined range into a recurrent neural network;
running, by the at least one processor, the recurrent neural network based on the first basic memory depth value, the first predetermined error threshold, the first set of weight values, and a back propagation of errors training method until a first final set of weight values converge to predict a first elementary sequence corresponding to the first basic memory depth value;
inputting, by the at least one processor, the second basic memory depth value, a second predetermined error threshold, and a second set of weight values between a second predetermined range into the recurrent neural network;
running, by the at least one processor, the recurrent neural network based on the second basic memory depth value, the second predetermined error threshold, the second set of weight values, and the back propagation of errors training method until a second final set of weight values converge to predict a second elementary sequence corresponding to the second basic memory depth value;
determining, by the at least one processor, a set of initial composite weight values based on a weighted average of the first final set of weight values and the second final set of weight values;
inputting, by the at least one processor, the set of initial composite weight values and a third predetermined error threshold into the recurrent neural network; and
running, by the at least one processor, the recurrent neural network based on the set of initial composite weight values, the third predetermined error threshold, and the back propagation of errors training method until a third final set of weight values converge to predict a future failure.

2. The method according to claim 1, further comprising:
determining, by the first processor, a number of state units to be used by the recurrent neural network based on a maximum value of the determined first and second basic memory depth values.

3. The method according to claim 2, wherein the number of state units is further determined based on the following rules:
if the maximum value of the determined first and second basic memory depth values is not greater than 350, the number of state units is 60 units;
if the maximum value of the determined first and second basic memory depth values is more than 350 units, but not greater than 1000 units, the number of state units is 120 units.

4. The method according to claim 1, wherein the first set of weight values related to the first basic memory depth value is based on the second set of weight values related to the second basic memory depth value, and wherein the second basic memory depth value is less than the first basic memory depth value by a predetermined value.

5. The method according to claim 4, wherein the predetermined value is an integer not greater than 5.

6. A system of machine failure prediction, comprising: at least one processor and at least one memory communicably coupled thereto,
wherein the at least one memory is configured to store data to be executed by the at least one processor,
wherein the at least one processor is configured to:
determine a first basic memory depth value and a second basic memory depth value based on a composite sequence of a machine failure history;
input, by the at least one processor, the first basic memory depth value, a first predetermined error threshold, and a first set of weight values between a first predetermined range into a recurrent neural network;
run, by the at least one processor, the recurrent neural network based on the first basic memory depth value, the first predetermined error threshold, the first set of weight values, and a back propagation of errors training method until a first final set of weight values converge to predict a first elementary sequence corresponding to the first basic memory depth value;
input, by the at least one processor, the second basic memory depth value, a second predetermined error threshold, and a second set of weight values between a second predetermined range into the recurrent neural network;
run, by the at least one processor, the recurrent neural network based on the second basic memory depth value, the second predetermined error threshold, the second set of weight values, and the back propagation of errors training method until a second final set of weight values converge to predict a second elementary sequence corresponding to the second basic memory depth value;

determine, by the at least one processor, a set of initial composite weight values based on a weighted average of the first final set of weight values and the second final set of weight values;
input, by the at least one processor, the set of initial composite weight values and a third predetermined error threshold into the recurrent neural network; and
run the recurrent neural network based on the set of initial composite weight values, the third predetermined error threshold, and the back propagation of errors training method to predict a future failure.

7. The system according to claim 6, wherein the at least one processor is further configured to determine a number of state units to be used by the recurrent neural network based on a maximum value of the determined first and second basic memory depth values.

8. The system according to claim 7, wherein the at least one processor is further configured to determine the number of state units based on the following rules:
if the maximum value of the determined first and second basic memory depth values is not greater than 350, the number of state units is 60 units;
if the maximum value of the determined first and second basic memory depth values is more than 350 units, but not greater than 1000 units, the number of state units is 120 units.

9. The system according to claim 6, wherein the first set of weight values related to the first basic memory depth value is based on the second set of weight values related to the second basic memory depth value, and wherein the second basic memory depth value is less than the first basic memory depth value by a predetermined value.

10. The system according to claim 9, wherein the predetermined value is an integer not greater than 5.

11. A non-transitory computer readable medium comprising computer program code to perform machine failure prediction, wherein the computer program code, when executed, is configured to cause the at least one processor in the at least one computer system to perform the method according to claim 1.

* * * * *